US008442339B2

(12) United States Patent
Martin et al.

(10) Patent No.: US 8,442,339 B2
(45) Date of Patent: May 14, 2013

(54) METHOD AND DEVICE FOR SELECTING IMAGES IN A SEQUENCE OF IRIS IMAGES RECEIVED IN A STREAM

(75) Inventors: Lionel Martin, Peynier (FR); William Ketchantang, Marseilles (FR); Stéphane Derrode, Marseilles (FR)

(73) Assignees: STMicroelectronics S.A., Montrouge (FR); Universite Paul Cezanne Aix-Marseille III, Aix en Provence Cedex (FR)

( * ) Notice: Subject to any disclaimer, the term of this patent is extended or adjusted under 35 U.S.C. 154(b) by 1238 days.

(21) Appl. No.: 11/901,974

(22) Filed: Sep. 18, 2007

(65) Prior Publication Data

US 2008/0075335 A1 Mar. 27, 2008

(30) Foreign Application Priority Data

Sep. 21, 2006 (FR) .................................. 06 08284

(51) Int. Cl.
*G06K 9/40* (2006.01)
(52) U.S. Cl.
USPC ........... 382/254; 382/255; 382/115; 382/117; 382/107; 382/206
(58) Field of Classification Search .................. 382/254, 382/117
See application file for complete search history.

(56) References Cited

U.S. PATENT DOCUMENTS

| 6,320,610 | B1 * | 11/2001 | Van Sant et al. ............. 348/143 |
| 2004/0101170 | A1 * | 5/2004 | Tisse et al. .................... 382/117 |
| 2005/0286802 | A1 * | 12/2005 | Clark et al. .................... 382/286 |
| 2006/0029262 | A1 | 2/2006 | Fujimatsu et al. |
| 2006/0177145 | A1 * | 8/2006 | Lee et al. ....................... 382/255 |

FOREIGN PATENT DOCUMENTS

WO 0039760 A1 7/2000

OTHER PUBLICATIONS

James Ivins, A deformable model of the human iris for measuring small three-dimensional eye movements, Machine Vision and Applications 1998.*
Chen, Yi et al., "Localized Iris Image Quality Using 2-D Wavelets," Advances in Biometrics, ICB 2006 3832:373-381, 2005.
Kalka, Nathan D., "Image Quality Assessment for Iris Biometric," Master Thesis, West Virginia University, Morgantown, ' West Virginia, pp. 1-50, 2005.
Kee, Gyundo et al., "Improved Techniques for an Iris Recognition System with High Performance," Lecture Notes Artificial Intelligence, 2256:177-188, 2001.
Ketchantang W. et al., "Video Pupil Tracking for Iris Based Identification," Lecture Notes in Computer Science 3708: 1-8, 2005.

(Continued)

*Primary Examiner* — Chan S Park
*Assistant Examiner* — Mark Roz
(74) *Attorney, Agent, or Firm* — Seed IP Law Group PLLC

(57) ABSTRACT

A method for selecting images from a set of images (according to sharpness and contrast criteria), comprising pre-selecting images by a simplified sharpness and/or contrast analysis of each image in the set of images, and of selecting images by a finer analysis of the sharpness and/or contrast of each pre-selected image. This method is particularly useful to perform an identification by recognition of the iris.

32 Claims, 7 Drawing Sheets

OTHER PUBLICATIONS

Lili, Pan et al., "The Algorithm of Iris Image Preprocessing," Automatic Identification Advanced Technologies, Fourth IEEE Workshop Buffalo, NY, pp. 134-138, Oct. 17-18, 2005.

Pratt, W., "Digital Image Processing," John Wiley & Sons, New York, pp. 34 and 725, 2001.

Tisse, C., "Person identification Technique Using Human Iris Recognition," Journal of System Research, 4:67-72, 2003.

Tisse, C., "Person Identification Technique Using Human Iris Recognition, "ST Journal of System Research, pp. 92-100, 2002.

Wei, Zhuoshi et al., "Robust and Fast Assessment of Iris Image Quality," Advances in Biometrics ICB, 3832:464-471, 2005.

Ma et al., "Personal Identification Based on Iris Texture Analysis," IEEE Transactions on Pattern Analysis and Machine Intelligence, 25(12)1519-1533, Dec. 2003.

\* cited by examiner

METHOD AND DEVICE FOR SELECTING IMAGES IN A SEQUENCE OF IRIS IMAGES RECEIVED IN A STREAM

BACKGROUND

1. Technical Field

The present disclosure relates to the field of digital image processing, and more particularly to the processing applied to digital images of the eye in identification or authentication applications.

2. Description of the Related Art

Iris recognition is a tried and tested biometric identification technique, provided that the image to which the analysis and identification processing is applied is an exploitable image. In particular, the performance of the recognition algorithms greatly depends on the sharpness of the image of the iris to be identified. Now, in most applications, and particularly in so-called "embedded" applications (for example, for access control to a mobile telephone or laptop computer, for a hardware key, etc.), the camera (digital sensor and lens) used has no auto-focus device, adjusting the (actual or simulated) focal length according to the distance.

Moreover, to obtain a sufficient resolution of the iris, the images are taken at a relatively short distance, generally in the order of 10 to 30 cm. The result is a low depth of field (range of distance between the camera and the eye, in which the image is sharp). Added to the fact that the eye is spherical, this low depth of field can cause differences in sharpness between zones of a same image of the eye. The user must be very cooperative by positioning himself in a relatively reduced sharpness zone. In practice, the user moves to position himself at a sharpness distance.

Processing is therefore often done prior to the actual iris recognition to select a sufficiently sharp image. This prior processing involves selecting out of a certain number of images, one or more sharp images which are subjected to an iris recognition algorithm.

The present disclosure relates more particularly to the selection processing applied to images of a same eye to select sufficiently sharp images to be sent to the recognition device.

BRIEF SUMMARY

The present disclosure aims to improve the existing selection methods, particularly by reducing the rate of non-exploitable images which are supplied to the analysis and identification processing.

The present disclosure also aims to offer a selection method which is compatible with embedded systems, particularly in terms of calculation resources used.

These objects may be achieved by an embodiment providing a method for selecting images from a set of images according to sharpness and contrast criteria.

According to one embodiment, a method comprises steps of:
  pre-selecting images by a simplified sharpness and/or contrast analysis of each image in the set of images, and
  selecting pre-selected images by a finer analysis of the sharpness and/or contrast of each pre-selected image.

According to one embodiment, the pre-selection of images comprises steps of:
  calculating a contrast of each image in the set of images,
  comparing the contrast obtained with a contrast threshold, and
  rejecting the image if the contrast obtained is lower than the contrast threshold.

According to one embodiment, the contrast CS is calculated using the following formula:

$$CS = \frac{I\max - I\min}{I\max + I\min}$$

wherein:

$I\max = \max_{i=1}^{N} G_t^i(x,y)$ $I\min = \min_{i=1}^{N} G_t^i(x,y)$ $G_t^i(x,y)$ represents the gray level or the luminance of the pixel of coordinates x and y in a region of the image t.

According to one embodiment, the set of images is a sequence of images received in a stream, the pre-selection of images comprising steps of:
  locating a pattern in each image of the sequence,
  estimating a speed of displacement of the pattern between two successive images in the sequence, and
  selecting the images for which the estimated speed of displacement of the pattern is lower than a speed threshold.

According to one embodiment, the location of the pattern in each image comprises steps of:
  estimating the position of the pattern in the image depending on the position of the pattern in a previous image of the sequence,
  defining a search zone of the pattern centered on the estimated position of the pattern in the image, and
  locating the pattern in the image by limiting the search to the search zone.

According to one embodiment, the position of the pattern in the image is estimated by implementing the standard Kalman model.

According to one embodiment, the pattern is the image of the pupil of an eye.

According to one embodiment, the pupil is located in the search zone by searching for pixels having a gray level or a luminance lower than an intensity threshold, and by determining the centre and the radius of a circle following approximately the contour of the pixels found.

According to one embodiment, the selection of the images comprises a step of measuring the density of the black pixels in a window for locating the pupil.

According to one embodiment, the selection of the images comprises a step of measuring the sharpness of the texture of the eye iris image.

According to one embodiment, the measurement of the sharpness of the texture of the iris is applied to the pixels of the iris situated on a substantially circular ring centered substantially on the centre of the pupil and having a width of at least one pixel.

According to one embodiment, the sharpness of the texture of the iris is measured from the energy of the medium-frequency components of the pixels situated on the ring.

According to one embodiment, the sharpness of the texture of the iris in an image t is measured by calculating a sharpness index I using the following formula:

$$I(t) = \frac{EMF}{ET - E\max}$$

wherein:
  EMF represents the energy of the medium-frequency components of an iris intensity profile of the pixels situated on the ring and located on the ring by an angle, ET is the total energy of the Fourier spectrum of the intensity profile, and Emax is the maximal energy of the Fourier spectrum of the intensity profile.

According to one embodiment, the selection of the images comprises a step of calculating a quality index according to a density measurement of the black pixels of the pupil, to a measurement of the sharpness of the texture of the iris and to a measurement of the speed of displacement of the pupil in relation to the previous image in the image sequence, and a step of comparing the quality index with a quality threshold, the images selected having a quality index greater than the quality threshold.

According to one embodiment, the quality index Q for an image t is obtained using the following formula:

$$Q(t) = \alpha d(t) + (1-\alpha)I(t) + \frac{1}{V(t) + \frac{1}{\varepsilon}}$$

wherein:

$\alpha$ and $\varepsilon$ are coefficients determined experimentally, and respectively equal preferably to 0.5 and 0.0001, d is the density of the black pixels in the window for locating the pupil in the image t, I is a sharpness index of the iris of the image t, and V is the estimated speed of the pupil in the image t in relation to the previous image.

According to one embodiment, the quality threshold is adjusted by a learning machine.

According to one embodiment, the method comprises a prior step of spatial sub-sampling of the images in the set of images.

According to one embodiment, the method comprises steps of storing a number of selected images, and of selecting a number of images having a highest sharpness and/or contrast out of the images stored.

Embodiments may also relate to a device for selecting images from a set of images according to sharpness and contrast criteria.

According to one embodiment, the device comprises:

an image pre-selection module for pre-selecting images by a simplified sharpness and/or contrast analysis of each image in the set of images, and an image selection module for selecting pre-selected images by a finer analysis of the sharpness and/or contrast of each pre-selected image.

According to one embodiment, the pre-selection module is configured to:

calculate a contrast of each image in the set of images, compare the contrast obtained with a contrast threshold, and reject the image if the contrast obtained is lower than the contrast threshold.

According to one embodiment, the set of images is a sequence of images received in a stream, the pre-selection module being configured to:

locate a pattern in each image of the sequence, estimate a speed of displacement of the pattern between two successive images of the sequence, and select images for which the estimated speed of displacement of the pattern is lower than a speed threshold.

According to one embodiment, the pre-selection module is configured to:

estimate the position of the pattern in the image depending on the position of the pattern in a previous image of the sequence, define a search zone of the pattern centered on the estimated position of the pattern in the image, and locate the pattern in the image by limiting the search to the search zone.

According to one embodiment, the pre-selection module is configured to estimate the position of the pattern in the image by implementing the standard Kalman model.

According to one embodiment, the pattern is the image of the pupil of an eye.

According to one embodiment, the pre-selection module is configured to locate the pupil in the search zone by searching for pixels having a gray level or a luminance lower than an intensity threshold, and by determining the centre and the radius of a circle following approximately the contour of the pixels found.

According to one embodiment, the selection module is configured to measure the density of the black pixels in a window for locating the pupil.

According to one embodiment, the selection module is configured to measure the sharpness of the texture of the eye iris image.

According to one embodiment, the selection module is configured to measure the sharpness of the texture of the eye iris image in a substantially circular ring centered substantially on the centre of the pupil and having a width of at least one pixel.

According to one embodiment, the selection module is configured to measure the sharpness of the texture of the iris from the energy of the medium-frequency components of the pixels situated on the ring.

According to one embodiment, the selection module is configured to calculate a sharpness index I(t) using the following formula:

$$I(t) = \frac{EMF}{ET - E\max}$$

wherein:

EMF represents the energy of the medium-frequency components of an iris intensity profile of the pixels situated on the ring and located on the ring by an angle, ET is the total energy of the Fourier spectrum of the intensity profile, and Emax is the maximum energy of the Fourier spectrum of the intensity profile.

According to one embodiment, the selection module is configured to calculate a quality index according to a density measurement of the black pixels of the pupil, to a measurement of the sharpness of the texture of the iris and to a measurement of the speed of displacement of the pupil in relation to the previous image in the image sequence, and a step of comparing the quality index with a quality threshold, the selected images having a quality index greater than the quality threshold.

According to one embodiment, the quality threshold is adjusted by a learning machine.

According to one embodiment, the device comprises a sub-sampling module which sub-samples the images in the set of images and which sends sub-sampled images to the pre-selection module.

According to one embodiment, the device comprises a memory zone for storing a number of images selected by the fine selection module and a selection module for selecting a number of images having a highest sharpness and/or contrast out of the images stored.

Embodiments may also cover a method or a device for selecting iris images on the basis of two parameters, i.e., the sharpness of the texture of the iris and the density of black pixels in the pupil.

The iris image selection method according to an embodiment comprises, for each iris image, steps of:
determining a zone for locating the pupil in the image,
measuring the density of the black pixels in the zone for locating the pupil,
measuring the sharpness of the texture of the iris in the image,
calculating a quality index of the image according to the density measurement of the black pixels of the pupil, and of the measurement of the sharpness of the texture of the iris, and
selecting the image if the image quality index is greater than a quality threshold.

According to one embodiment, the pupil is located in a search zone by searching for pixels having a gray level or a luminance lower than an intensity threshold, and by determining the centre and the radius of a circle following approximately the contour of the pixels found.

According to one embodiment, the measurement of the sharpness of the texture of the iris is applied to the pixels of the iris situated on a substantially circular ring centered substantially on the centre of the pupil and having a width of at least one pixel.

According to one embodiment, the sharpness of the texture of the iris is measured from the energy of the medium-frequency components of the pixels situated on the ring.

According to one embodiment, the sharpness of the texture of the iris in the image t is measured by calculating a sharpness index I(t) using the following formula:

$$I(t) = \frac{EMF}{ET - E\max}$$

wherein:
EMF represents the energy of the medium-frequency components of an iris intensity profile of the pixels situated on the ring and located on the ring by an angle,
ET is the total energy of the Fourier spectrum of the intensity profile, and
Emax is the maximal energy of the Fourier spectrum of the intensity profile.

According to one embodiment, the method comprises a step of measuring the speed of displacement of the pupil in relation to a previous image in an image sequence, the quality index varying according to the measured speed of the pupil.

According to one embodiment, the quality index Q(t) for an image t is obtained using the following formula:

$$Q(t) = \alpha d(t) + (1-\alpha)I(t) + \frac{1}{V(t) + \frac{1}{\varepsilon}}$$

wherein:
α and ε are coefficients determined experimentally, and respectively equal preferably to 0.5 and 0.0001,
d(t) is the density of the black pixels in the window for locating the pupil in the image t,
I(t) is a sharpness index of the iris of the image t, and
V(t) is the estimated speed of the pupil in the image t in relation to the previous image.

According to one embodiment, the quality threshold is adjusted by a learning machine.

The image selection device according to an embodiment implements the image selection method as defined above.

An embodiment covers a method and a device for estimating the sharpness of the iris in iris images, on the basis of a spectrum analysis of pixels of the iris situated on a ring centered on the pupil.

An embodiment of a method for estimating the sharpness of the iris in iris images comprises, for each image, steps of:
determining the centre and the radius of the pupil in the image,
determining a ring of a width of at least one pixel situated on the iris and centered on the centre of the pupil, and
measuring the sharpness of the texture of the iris from the spectrum analysis of the pixels of the image situated on the ring.

According to one embodiment, the pupil is located in a search zone by searching for pixels having a gray level or a luminance lower than an intensity threshold, and by determining the centre and the radius of a circle following approximately the contour of the pixels found.

According to one embodiment, the sharpness of the texture of the iris is measured from the energy of the medium-frequency components of the pixels situated on the ring.

According to one embodiment, the sharpness of the texture of the iris in the image t is measured by calculating a sharpness index I(t) using the following formula:

$$I(t) = \frac{EMF}{ET - E\max}$$

wherein:
EMF represents the energy of the medium-frequency components of an iris intensity profile of the pixels situated on the ring and located on the ring by an angle,
ET is the total energy of the Fourier spectrum of the intensity profile, and
Emax is the maximal energy of the Fourier spectrum of the intensity profile.

A device for estimating the sharpness of the iris according to an embodiment implements the image selection method as defined above.

In one embodiment, a method for selecting images from a set of images comprises: automatically pre-selecting images based on a first analysis of at least one of a sharpness and a contrast of each image in the set of images to produce a set of pre-selected images; and automatically selecting images based on a second analysis of at least one of a sharpness and a contrast of each image in the set of pre-selected images to produce a set of output images. In one embodiment, the pre-selecting of images comprises: determining a contrast of each image in the set of images; comparing the contrast obtained with a contrast threshold; and rejecting an image if the contrast obtained is lower than the contrast threshold. In one embodiment, the set of images is a sequence of images received in a stream and the pre-selection of images comprises: locating a pattern in each image of the sequence; estimating a speed of displacement of the pattern between two successive images in the sequence; and selecting the images for which the estimated speed of displacement of the pattern is lower than a speed threshold. In one embodiment, locating the pattern in each image comprises: estimating a position of the pattern in the image depending on the position of the pattern in a previous image of the sequence; defining a search zone of the pattern centered on the estimated position of the pattern in the image; and searching the search zone for the pattern. In one embodiment, the pattern is an image of a pupil of an eye. In one embodiment, the image of the pupil is located in the search zone by searching for pixels having an intensity lower than an intensity threshold, and by determining a center and a radius of a circle following approximately a contour of the pixels having an intensity lower than the intensity threshold. In one embodiment, the selection of images comprises a step of measuring a density of black pixels in a window for locating the pupil in each image. In one embodiment, the selection of images comprises a step of measuring a sharpness of a texture of an eye iris image in each image. In one embodiment, the measuring the sharpness of the texture of the iris is applied to the pixels of the image of the iris situated on a substantially circular ring centered substantially on a center of the image of the pupil and having a width of at least one pixel. In one embodiment, the measuring the sharpness of the texture of the image of the iris comprises measuring energy of medium-frequency components of pixels situated on the ring. In one embodiment, the selection of the images comprises a step of calculating a quality index for each image according to a density measurement of black pixels of the pupil image, to a measurement of sharpness of the texture of the iris image and to a measurement of speed of displacement of the pupil in the image in relation to the previous image in the image sequence, and a step of comparing the image quality index with a quality threshold, the images selected having a quality index greater than the quality threshold. In one embodiment, the method further comprises a prior step of spatial sub-sampling of the images in the set of images. In one embodiment, the method further comprises steps of storing a first number of selected images, and of selecting a second number of images having at least one of a highest sharpness and contrast out of the images stored.

In one embodiment, a device for selecting images from a set of images according to sharpness and contrast criteria comprises: an image pre-selection module configured to select images based on at least one of a sharpness and a contrast analysis of images in the set of images; and an image output selection module configured to selectively output images selected by the pre-selection module based on an analysis of at least one of a sharpness and a contrast of each pre-selected image. In one embodiment, the pre-selection module is configured to calculate a contrast of each image in the set of images; compare the contrast obtained with a contrast threshold; and select the image if the contrast obtained is higher than the contrast threshold. In one embodiment, the set of images is a sequence of images received in a stream and the pre-selection module is configured to locate a pattern in each image of the sequence; estimate a speed of displacement of the pattern between two successive images of the sequence; and select images for which the estimated speed of displacement of the pattern is lower than a speed threshold. In one embodiment, the pre-selection module is configured to estimate a position of the pattern in a current image depending on the position of the pattern in a previous image of the sequence; define a search zone of the pattern centered on the estimated position of the pattern in the image; and locate the pattern in the current image by limiting the search to the search zone. In one embodiment, the pattern is the image of the pupil of an eye.

In one embodiment, a system for processing a sequence of images in an image stream comprises: means for determining whether images in the image stream satisfy a contrast criteria; and means for determining whether images which satisfy the contrast criteria satisfy a sharpness criteria, coupled to the means for determining whether images in the image stream satisfy the contrast criteria. In one embodiment, the means for determining whether images in the image stream satisfy the contrast criteria comprises: a pupil detection and locating module; a quick-image selection module; and a pupil tracking module. In one embodiment, the means for determining whether images in the image stream satisfy the contrast criteria further comprises a sub-sampling module. In one embodiment, the means for determining whether images which satisfy the contrast criteria satisfy the sharpness criteria comprises a fine-image selection module. In one embodiment, the means for determining whether images which satisfy the contrast criteria satisfy the sharpness criteria further comprises an image memory and an image-selection module. In one embodiment, the means for determining whether images which satisfy the contrast criteria satisfy the sharpness criteria further comprises a learning module. In one embodiment, the system further comprises: a recognition device coupled to the means for determining whether images which satisfy the contrast criteria satisfy sharpness criteria.

BRIEF DESCRIPTION OF THE SEVERAL VIEWS OF THE DRAWING(S)

These and other objects, features and advantages of embodiments shall be presented in greater detail in the following description, given in relation with, but not limited to the following figures, in which.

Figures 3A, 3B:
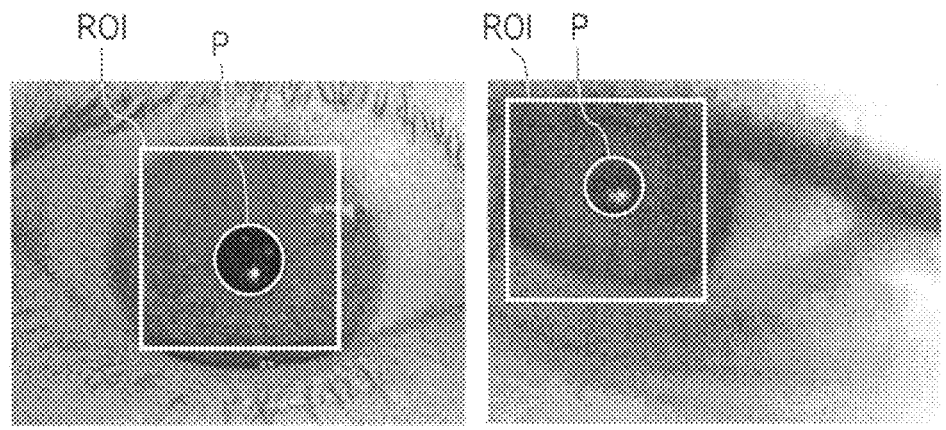
Figure 3C:
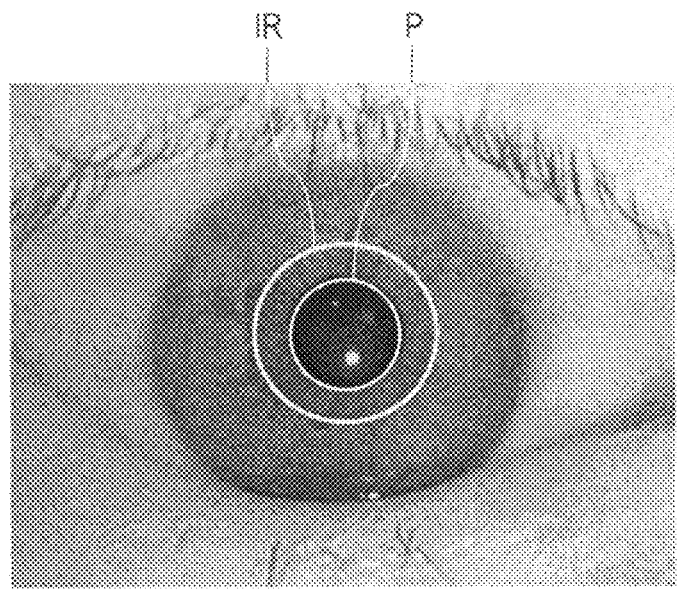
Figure 4:
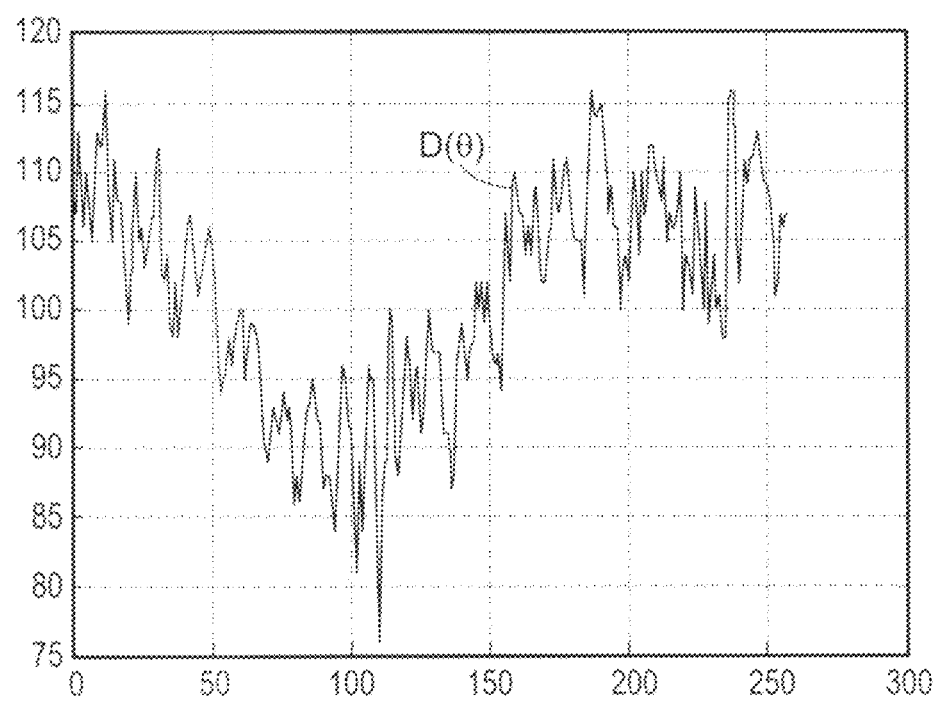
Figure 5:
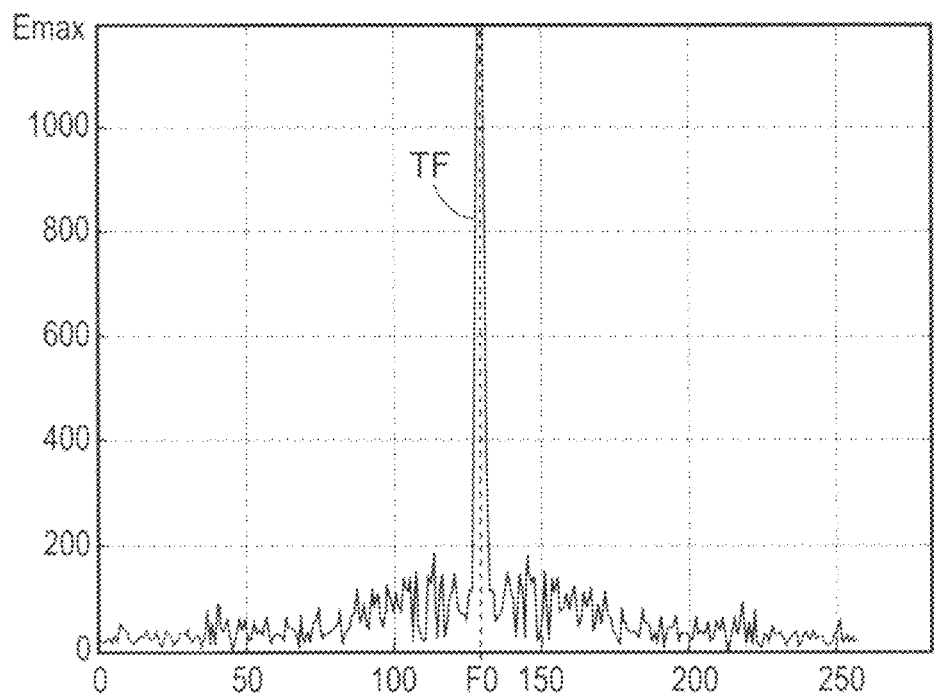
Figure 6:
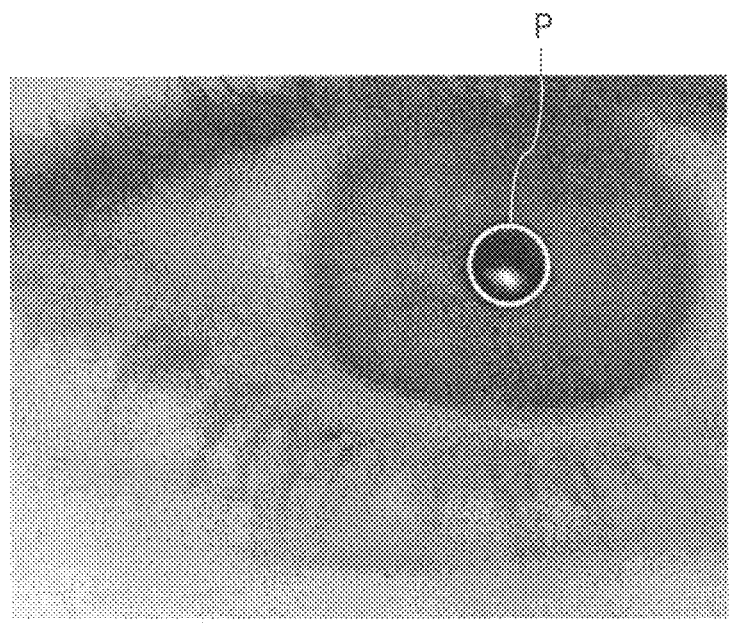
Figure 7:
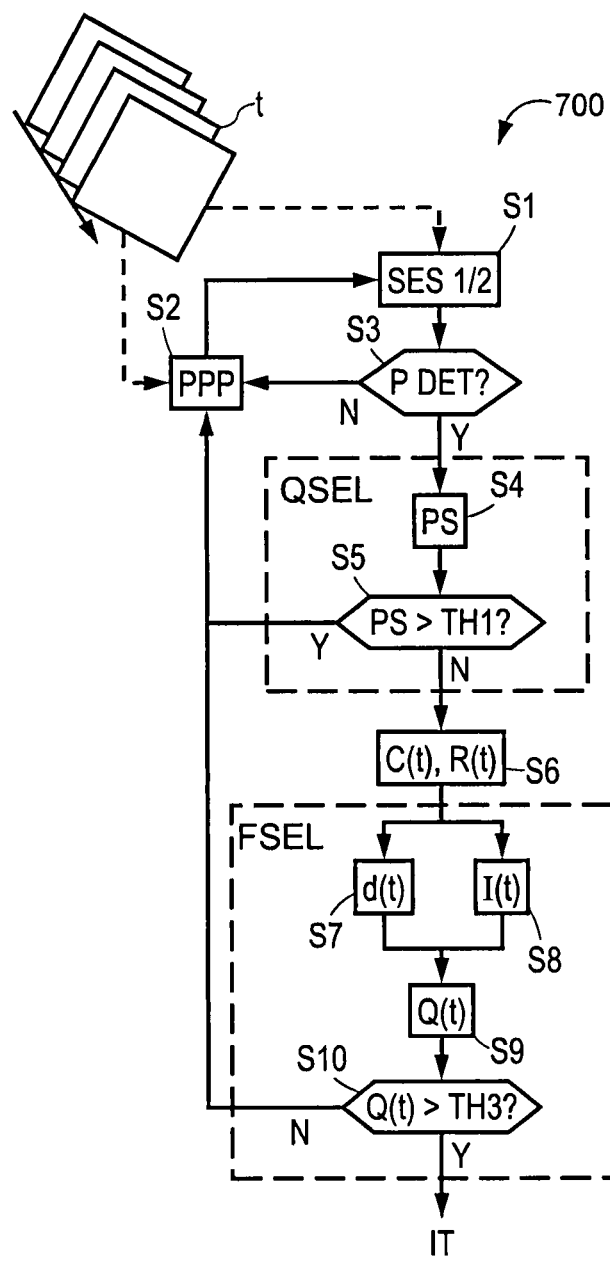
Figure 10:
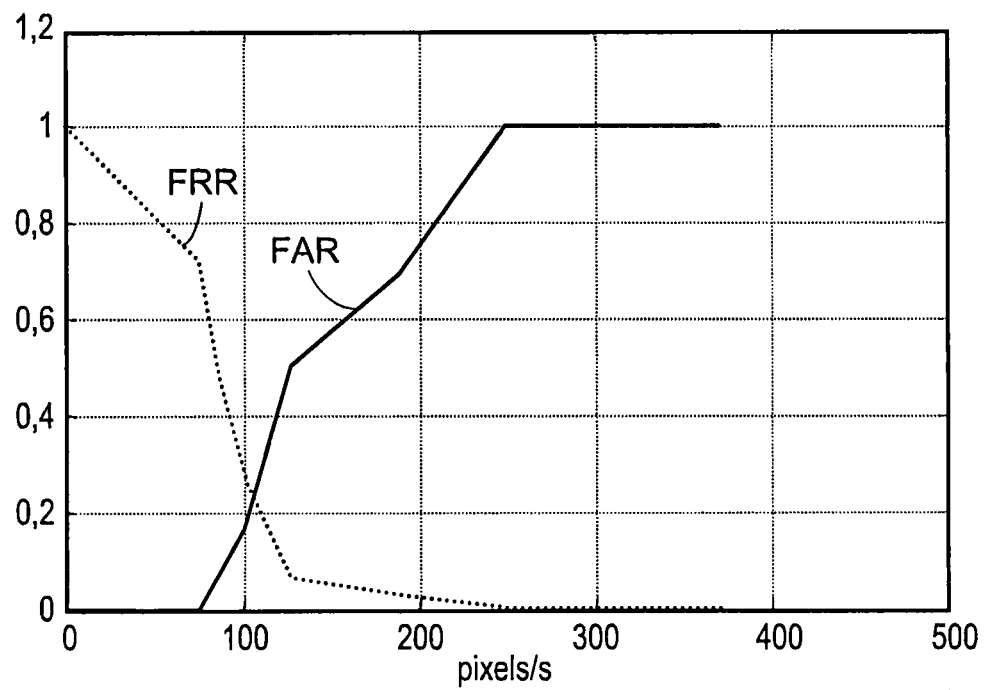
Figure 11:
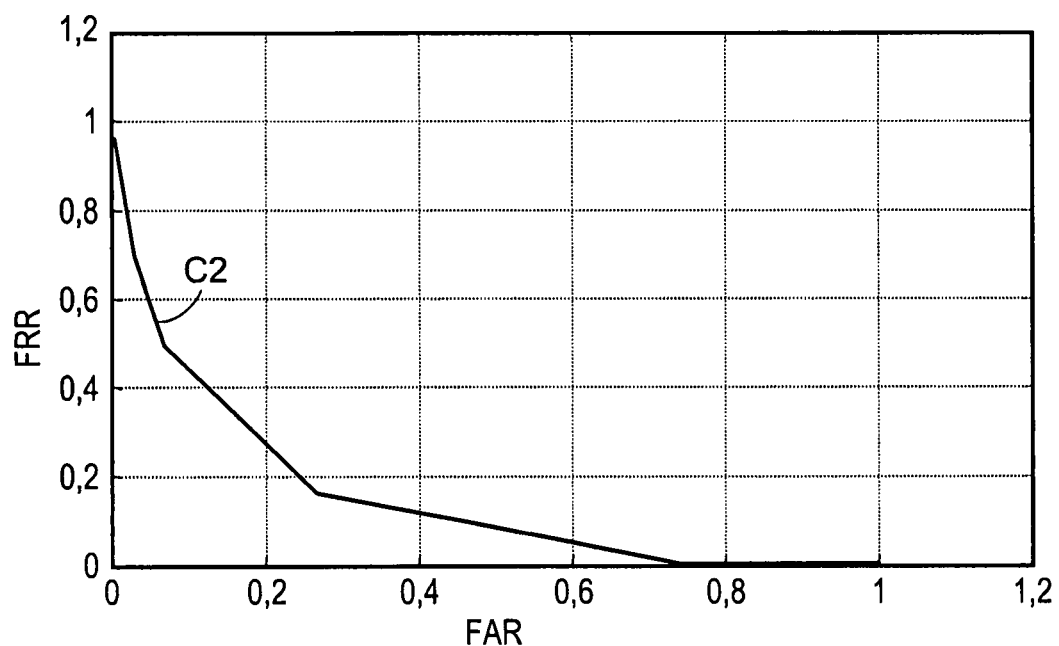
Figure 12:
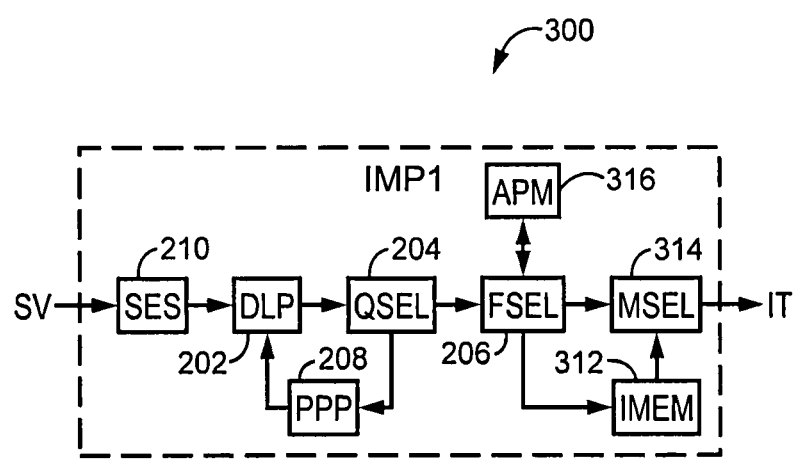

FIGS. 3A, 3B and 3C are images of an eye showing a method for selecting iris images according to one embodiment, FIGS. 4 and 5 are curves showing the method for selecting iris images according to one embodiment, FIG. 6 is an example of an out-of-focus iris image capable of being processed by the selection method according to one embodiment, FIG. 7 is a flowchart showing different steps of the selection method according to one embodiment, FIGS. 8 to 11 are curves showing the performance of an embodiment of an iris image selection method, and FIG. 12 represents in block form a selection device according to an embodiment.

DETAILED DESCRIPTION

Certain selection devices record a sequence of images, then calculate a sharpness index using a sharpness operator, and finally select the images having the best sharpness indices. Out of the most commonly used sharpness operators, Tenegrad, SML (Sum Modified Laplacian), SMD (Sum Modulus Difference), and FSWM (Frequency Selective Weighted Median Filter) can be mentioned. FSWM proves to be the most insensitive to noise and has the best performance particularly in terms of required calculation resources.

This selection mode offers the advantage of being rapid, and not increasing the cost of the system. However, in practice it is difficult to acquire an exploitable iris image, as the user is not very cooperative. The sharpness distance (about 25 cm) is not always respected. The user very often moves so as to position himself at the proper sharpness distance, and sometimes he promptly shuts his eyes. The images supplied by the camera are often of poor quality (images out of focus, blurred images due to excessively rapid eye movement, to the quality of the optical system, presence of eyelashes in front of the iris, presence of white spots in the pupil due to the reflections of a light source, etc.). The sharpest images selected by the selection device are therefore often of insufficient quality to precisely locate the iris in the image or to recognize the latter.

Figure 1:
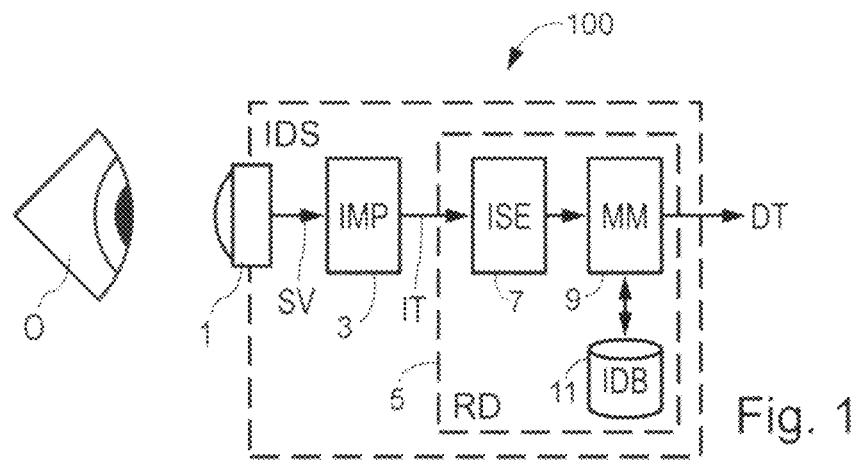
FIG. 1 represents in block form an iris recognition system.

FIG. 1 represents system IDS 100 configured to recognize an iris. The system IDS 100 is configured to use eye images to perform an identification or authentication by iris recognition. The IDS system 100 comprises a digital image sensor 1 which acquires a sequence of video frames or digital images SV of an eye O of a user, an image selection device IMP 3 which receives the sequence of images SV, and an iris recognition device ID 5 using the images selected IT by the device IMP 3 to recognize the iris images. The device ID 5 comprises an iris signature extraction module ISE 7 which extracts an iris signature from the images selected by the module IMP 3, and a comparison module MM 9 connected to an iris signature database IDB 11, which searches to find out whether the iris signature supplied by the module ISE 7 is in the database IDB 11. The module MM 9 supplies a detection signal DT indicating whether or not the iris of the subject has been recognized, and other information if desired, such as information indicative of the identity of the subject.

For more clarity, the modules or steps which are useful to understand the present disclosure have been represented in the figures and will be described subsequently. Unnecessary details have been omitted to facilitate illustration. In particular, the iris signature extraction ISE 7 and iris recognition MM 9 modules using the selection method of embodiments of the present disclosure have not been detailed, embodiments of the present disclosure being generally compatible with any downstream exploitation of the images selected. Similarly, the way in which the images to be processed by the embodiments of the present disclosure have been obtained has not been detailed, embodiments of the present disclosure there again being generally compatible with any digital image of an eye, in gray level or in color.

Figure 2:
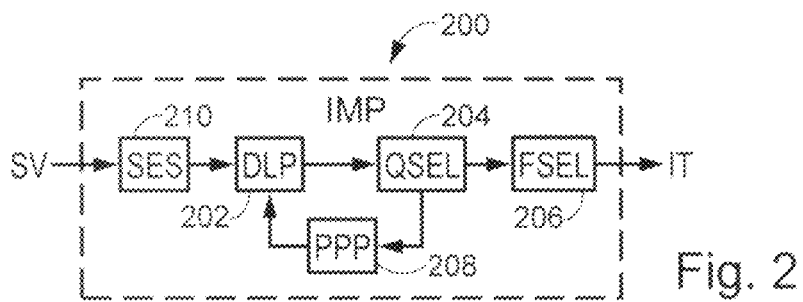
FIG. 2 represents in block form a selection device according to one embodiment.

FIG. 2 represents an embodiment of a selection device IMP 200. The device IMP 200 analyses in real time each frame or image of a sequence of images SV, and selects the images IT having a sufficient quality to enable the iris to be located and the user to be identified. The device IMP 200 comprises a pupil detection and location module DLP 202 for detecting and locating the pupil, a quick image pre-selection or selection module QSEL 204, an image selection or fine image selection module FSEL 206, and a pupil tracking module PPP 208 for tracking the pupil.

The module DLP 202 searches for the pupil (black region) in each image of the sequence in a so-called "region of interest" ROI search zone in which the pupil is supposed to be situated. The pupil is detected in an image by measuring the contrast in the search zone. The region ROI is advantageously estimated according to one or more previous images by the module PPP 208.

FIGS. 3A and 3B are images of eyes on which the region of interest ROI has been represented. In the example of FIGS. 3A and 3B, the region ROI has a square shape substantially covering the whole iris. Regions of interests having other shapes and covering larger or smaller portions of the iris may be employed in some embodiments.

If the signal/noise ratio of the image is sufficient, the following method can be used to detect the pupil.

First of all, a contrast value CS is calculated using the following:

$$CS = \frac{I\max - I\min}{I\max + I\min} \quad (1)$$

wherein:

$$I\max = \max_{i=1}^{N} G_t^i(x,y) \quad (2)$$

$$I\min = \min_{i=1}^{N} G_t^i(x,y) \quad (3)$$

$G_t^i(x,y)$ represents the gray level or the luminance of the pixel i of the region ROI of the image t having the coordinates (x, y) in the image.

The measurement of Imax is obtained from the gray levels having a gray level lower than a threshold TH, so as not to take into account the saturated pixels resulting from the specular reflection of a light source emitting in the near infrared. The contrast value CS obtained is then compared with a contrast threshold CT. It is indeed considered that the pupil can be detected when the contrast in the region ROI is sufficiently high, for example in the order of 0.6. If the contrast of the image is lower than the threshold CT, the image is rejected.

Then, if the contrast CS is greater than the contrast threshold CT, the pupil is located in the image t by the module DLP 202 by positioning in the image a circle P (represented by a white line in FIGS. 3A, 3B) of centre C(t) and of radius R(t) approximately following the contour of the pupil. The position of the centre C(t) is determined by searching for the pixels having a gray level lower than an intensity threshold IT.

The intensity threshold IT is determined according to the distribution of the gray levels $G_t^i(x,y)$ of the pixels in the region ROI by the following equation:

$$IT = \mu - \sigma \quad (4)$$

wherein $\mu$ represents the average and $\sigma$ the standard deviation of the histogram of the gray levels or of the luminance $G_t^i(x,y)$ of the pixels in the region ROI. Using such an adaptative threshold makes the detection of the pupil insensitive to the changes in luminosity of the images.

The centre C(t) and the radius R(t) of the pupil are then determined. For this purpose, each point of the region of interest ROI is considered the potential centre C(t) and the gradients of the points situated on arcs of circle centered on the considered potential centre are measured. The radii of these arcs of circle vary within a range of possible radii of a pupil, and the centre of the pupil corresponds to the point for which the variation of the gradient is the greatest. The variations of the gradient are determined using integro-differential operators.

Thus, the radius R(t) of the pupil may be determined using integro-differential operators by the following equation:

$$R(t) = \text{Argmax}_r \left| \frac{\partial}{\partial c} \left\{ \sum_{i \in C} G_t^i \{x_i(r, \theta), y_i(r, \theta)\} \right\} \right| \quad (5)$$

wherein:

C represents the circle of radius R, R varying between estimated minimum Rmin and maximum Rmax values of the radius of the pupil, Argmax represents a function supplying the radius R having a maximum score in relation to a normalized formula.

In other words, the radius R(t) is obtained by taking the maximum value of the integral of the norm of the gradient at the radius R-1 minus the integral of the norm of the gradient at the radius R.

According to another so-called "by segmentation" method, the centre C(t) is determined by calculating the geometrical centre of the pupil region segmented in the region ROI. The segmentation of the pupil in the region ROI is obtained by adaptative histogram thresholding. Thus, all the pixels that have a gray level lower than the threshold IT will take the value 255 as gray level, and the others will take the value 0, hence the segmentation of the pupil.

Another method for determining the centre C(t) and the radius R(t) of the pupil is exposed in the document Tisse, et al. "Person identification technique using human iris recognition", Journal of System Research, vol. 4, pp. 67-75, 2003.

The module PPP 208 performs a prediction of the position P(t/t-1) of the centre of the pupil in the next image t, particularly from the position of the centre C(t-1) of the pupil in the current image, and the previous measurements of the centre of the pupil. For this purpose, it may implement the standard Kalman model SKF as described particularly in the document "Video Pupil Tracking for Iris based Identification", W. Ketchantang, S. Derrode, S. Bourennane, and L. Martin, ACIVS 2005, LNCS3708, pp 1-8, 2005.

The Standard Kalman model predicts the state of a system from the previous measurements made on the latter so as to minimize the covariance matrix of the prediction error.

Once the predicted position P(t/t-1) is determined, the module PPP 208 also positions the region of interest ROI(t) in the following image t. The region ROI(t) is centered on the predicted position P(t/t-1) and has sides of a length chosen, for example, in the order of four times the radius of the pupil R(t-1) in the current image t-1 (according to the dilation of the pupil).

The quick selection module QSEL 204 estimates the speed V(t) of displacement of the pupil between the image t and the previous image t-1. If the speed thus determined is too high (greater than a speed threshold VT), it is considered that the image of the iris in the current image t is blurred, and therefore non-exploitable to perform an identification. As a result, the image t is rejected.

The estimated speed of displacement V(t) of the pupil is obtained from the predicted position P(t/t-1) of the centre of the pupil in the image t and from the measured position C(t) of the centre of the pupil in the image t:

$$V(t) = \frac{1}{\Delta T} \|P(t/t-1)C(t)\| \quad (6)$$

wherein ΔT is equal to the time interval between two consecutive images in the sequence of images SV (for example 1/25 s), and ||P(t/t−1)C(t)|| represents the distance in number of pixels between the points P(t/t-1) and C(t).

The module FSEL 206 locates in each image selected by the module QSEL 204 a substantially circular ring situated in the iris and centered on the centre of the pupil, as shown in FIG. 3C. In FIG. 3C, the ring IR has an internal radius equal to about 1.5 times the radius R(t) of the pupil in the image t and a width of at least one pixel. All the pixels of the iris situated on the ring IR are extracted to form an intensity profile of the iris. The intensity profile gives the intensity D(t,θ) (luminance or gray level) of each pixel extracted from the image t according to an angle θ determining the position of the pixel on the ring IR. The intensity profile of the iris characterizes the quality of the texture of the iris.

Taking into account only the pixels situated on a ring enables in certain cases a partial masking of the iris by the eyelashes or an eyelid to be removed.

FIG. 4 represents an example of iris intensity profile D(t,θ) according to the angle θ. The module FSEL 206 then calculates the Fourier transform (Fast Fourier Transform FFT) at each image profile D(t,θ). The profile used to calculate the Fourier transform may consist, for example, of a number of points to the power of 2 to speed up the calculation, for example 256 points. In the example in FIG. 4, these 256 points represent the entire circle (256 points correspond to 360°). The curve of amplitude variation of the Fourier transform TF of the signal D(t,θ) is represented in FIG. 5. The Fourier transform of the signal D(t,θ) comprises a very marked peak centered on the centre frequency (F0/2=128). Given the symmetry of the Fourier spectrum, only the left-hand half of the spectrum is used.

The module FSEL 206 then calculates a sharpness index by advantageously using the energies of the medium-frequency components of the spectrum of the signal D(t,θ). The field of medium frequencies is for example chosen equal to F0/2+/−F0/4, F0 being the centre frequency of the spectrum.

The sharpness index of the iris may be calculated using the following formula:

$$I(t) = \frac{EMF}{ET - E\max} \quad (7)$$

wherein:

EMF is the energy of the medium-frequency components of the signal D(t,θ),

ET is the total energy of the Fourier spectrum, and

Emax is the maximal energy of the Fourier spectrum, which corresponds to the energy at the centre frequency F0 of the spectrum.

In the medium-frequency field, it transpires that the sharpness index obtained is less sensitive to noise and to the presence of eyelashes in front of the iris.

It shall be noted that the measurement of the image sharpness obtained using the previous formula is independent of the contrast. Indeed, if the image G' is less contrasted than the image G, D'=γ D with 0<γ<1. The result is the following equations:

$$EMF(D') = \sum_{MF} \sum \|\lambda D(u)\|^2 = \lambda^2 \sum_{MF} \sum \|D(u)\|^2 \quad (8)$$

$$ET(D') = \sum_{SF} \sum \|\lambda D(u)\|^2 = \lambda^2 \sum_{SF} \sum \|D(u)\|^2 \quad (9)$$

$$E\max = \|\lambda D(0)\|^2 = \lambda^2 \|D(0)\|^2 \quad (10)$$

wherein (0) is the centre of the Fourier spectrum,

MF is the medium-frequency field in the Fourier space, SF is the Fourier spectrum. As a result, the sharpness index I(G') of the image G' is equal to the sharpness index I(G) of the image G.

The module FSEL 206 then determines a quality index Q(t) of the iris in the image t. The quality index Q(t) is for example calculated using the following formula:

$$Q(t) = \alpha d(t) + (1-\alpha)I(t) + \cfrac{1}{V(t) + \cfrac{1}{\varepsilon}} \quad (11)$$

wherein:

α and σ are coefficients that may be determined experimentally and may be equal for example to 0.5 and 0.0001, and d(t) is the density of the black pixels in the window P for locating the pupil in the image t and is determined by dividing the number of pixels identified as belonging to the pupil by the total number of pixels of the region ROI.

The quality index Q(t) enables an image to be detected that is greatly out of focus (very spread white spot in the pupil and therefore low d(t)), and/or not very sharp due to a high speed of displacement of the iris (close to the speed threshold VT), and/or in which the iris has a low sharpness index.

If the quality index Q(t) is lower than a quality threshold QT, the module FSEL 206 rejects the image t. The threshold QT may be chosen empirically so as to obtain a low rate of false alarms FAR (images of insufficient quality selected) and a low rate of false rejections FRR (images of sufficient quality rejected).

It will be understood that the quality index may ignore the speed of displacement of the iris V(t), the latter being already used as a selection criterion by the quick selection module QSEL 204. In this case, the last term of the sum giving the quality index in the formula (II) may be removed.

FIG. 6 represents an image rejected by the module FSEL 206 as it is out of focus: the density of the black pixels of the pupil d(t) in it is equal to 0.52.

Thanks to the combination of the quick selection module QSEL 204 and of the fine selection module FSEL 206, the module IMP is capable of processing in real time a sequence of images with low FAR and FRR rates, without implementing any high-performance calculation means.

As an example, an image of 640×480 pixels can be processed in 20 ms on average using a personal computer equipped with a microprocessor of Pentium 4 type running at 3 GHz and programmed in C++ language.

However, to reduce the image processing operations performed by the modules DLP, QSEL and FSEL, the selection module IMP 200 may also comprise a sub-sampling module SES 210 which applies spatial sub-sampling processing to the images in the sequence of images. The sub-sampling processing involves reducing the resolution of the images by a factor for example equal to 4, to change from 640×480-pixel images to 320×240-pixel images. This sub-sampling processing has little impact on the performances of the image selection processing according to the present invention.

FIG. 7 represents different steps of a method 700 according to one embodiment. For convenience, the method 700 is described by way of example with reference to the selection device 200 described in FIG. 2. Other devices may be configured to perform embodiments of the method. The method comprises steps S1 to S10.

In step S1, the image is sub-sampled by the module SES 210. In step S2, the position of the pupil in the next image is assessed by the module PPP 208. In step S3, if the pupil is not detected in the current image given the assessed position, the current image is rejected and the modules SES 210 and PPP 208 process the next image. If the pupil is detected, the speed of displacement of the pupil between the previous image and the current image is estimated in step S4. If in step S5, the speed of displacement of the pupil is greater than the speed threshold VT, the image is rejected and the modules SES 210 and PPP 208 process the next image (steps S1 and S2). If the speed of displacement of the pupil is lower than the threshold VT, the parameters used to locate the pupil are updated in step S6. This step corresponds to determining the centre C(t) and the radius R(t) of the pupil. In steps S7 and S8, the module FSEL 206 assesses the density of the black pixels in the pupil and determines the sharpness of the iris. In step S9, the module FSEL 206 calculates the quality index Q(t) of the image. In step S10, the module FSEL 206 compares the quality index Q(t) obtained with the threshold QT. If the quality index is lower than the threshold QT, the image is rejected and the modules SES 210 and PPP 208 process the next image (steps S1 and S2), otherwise the image is selected to perform an identification and is therefore sent to the iris recognition device RD 5 (see FIG. 1).

Thanks to the fast tracking of the pupil performed over time by the modules PPP 210 and QSEL 204, the pupil is precisely and rapidly located without any significant calculation means, the search zone of the pupil being limited to the zone ROI. The movement of the pupil between two images can therefore be assessed so as to determine whether its speed is too high (significant blur).

The tracking model implemented by the module PPP 208 loses the pupil or partially locates it when the eyes are shut, when the defocusing depth is significant, when the pupil does not appear in the image, when the contrast in the zone ROI is low, or when the speed of the pupil between two images is too high (blurred image). Marked defocusing causes a spread of the intensity of the pixels of the pupil and therefore decreases the contrast in the region ROI. The tracking module PPP 208 is capable of detecting and locating the pupil even after being lost in the previous images.

FIGS. 8 to 11 represent curves showing the performances of the method according to the present invention. These curves are obtained using a learning base made up of 177 images including 50 sharp images, 100 blurred and out-of-focus images and 27 various non-exploitable images.

Figure 8:
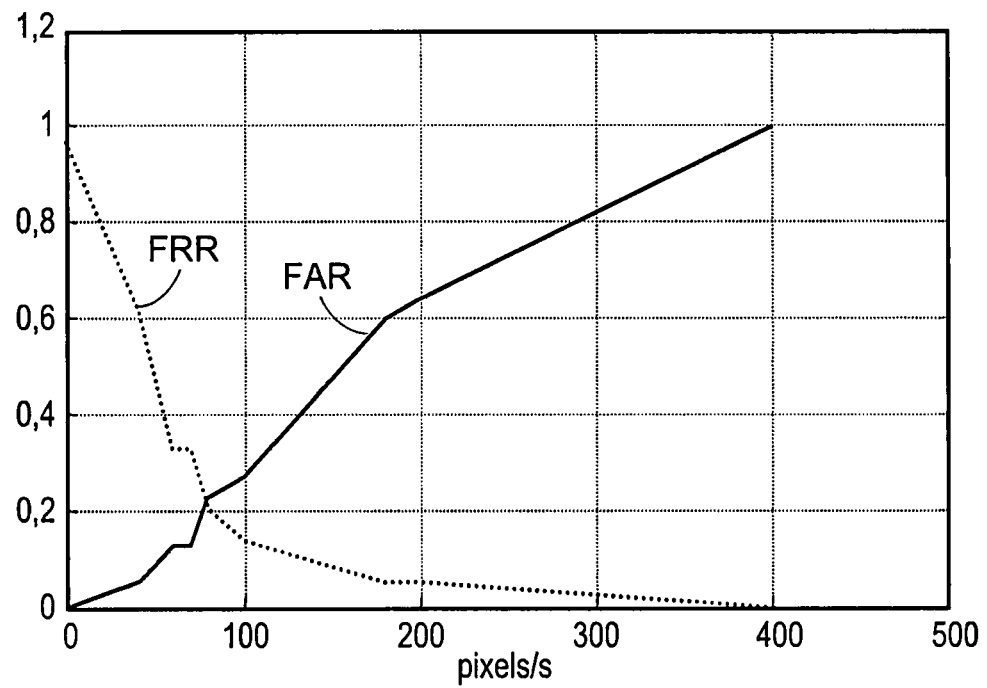

FIG. 8 shows the influence of the speed threshold VT on the rate of false alarms FAR and on the rate of false rejections FRR at the quick selection module QSEL output. If the speed threshold is increased, the rate of false rejections decreases, but the rate of false alarms increases. FIG. 8 shows that the rate of false rejections decreases more rapidly than the rate of false alarms increases. The curves of variation of the rates FAR and FRR cross at a value of the threshold VT of about 90 pixels/s, when the rates present a value of about 0.2.

Figure 9:
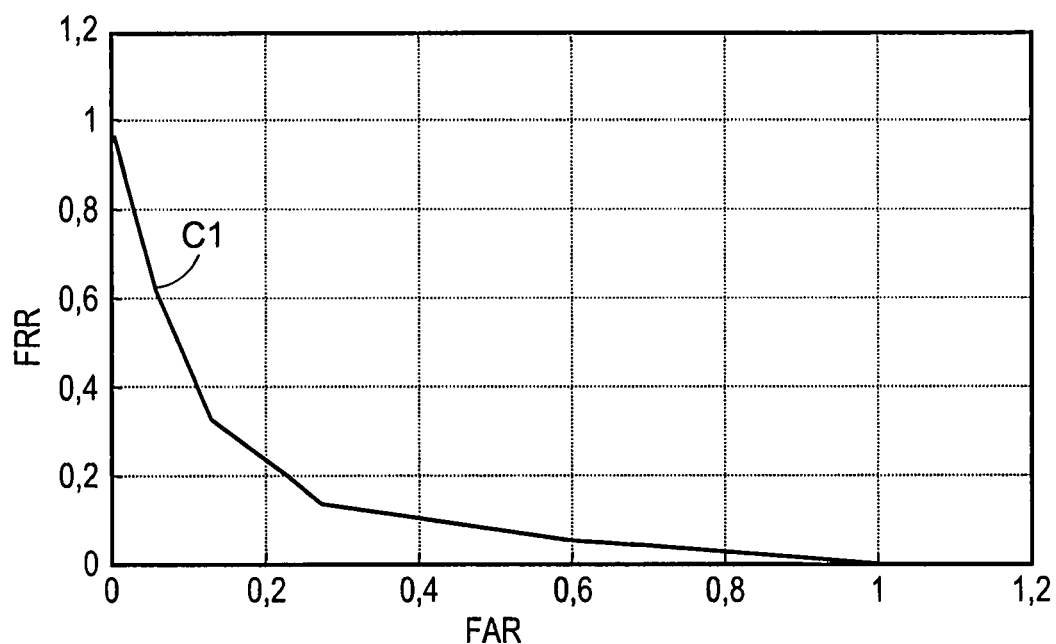

FIG. 9 represents a curve of evolution C1 of the rate of false rejections FRR according to the rate of false alarms FAR at output of the module QSEL.

If a threshold VT equal to 70 pixels/s is chosen, a rate FAR equal to about 13% and a rate FRR equal to about 35% are obtained for the module FSEL. At output of the recognition device RD, rates of false alarms and of false rejections respectively of 0.03% and 8% are obtained (these rates are obtained using a base of 150 different videos coming from 74 different eyes, with 223,000,000 inter-class comparisons and 6,000,000 intra-class comparisons). The module FSEL enables the values of these rates to be reduced.

FIGS. 10 and 11 show the influence of the quality threshold QT on the rate of false alarms FAR and on the rate of false rejections FRR at the fine selection module FSEL output.

FIG. 10 represents curves of evolution of the rate of false alarms FAR and of the rate of false rejections FRR at the fine selection module FSEL output according to the threshold QT. FIG. 11 represents a curve of evolution C2 of the rate of false rejections FRR according to the rate of false alarms FAR at output of the module FSEL.

If a threshold QT equal to 1 is chosen, the rate of false alarms FAR and of false rejections FRR at the output of the module FSEL are respectively equal to 7% and 49% (these values are obtained on the same learning base as the previous one). At output of the recognition device RD, these rates decrease to reach values respectively equal to 0.037% and 2.9%. These rates are obtained with 25,000,000 inter-class comparisons and 1,000,000 intra-class comparisons.

The rate FAR can be reduced by storing a number K of exploitable iris images, then by selecting the M best images out of the K images stored (M<K). Thus, FIG. 12 represents a selection device IMP1 300 according to another embodiment. The device IMP1 300 is similar to the device IMP 200 represented in FIG. 2, except that it further comprises an image memory IMEM 312 and an image selection module MSEL 314 coupled to the memory IMEM 312. The module FSEL 206 stores in the memory IMEM 312 all the images having a quality index greater than the threshold QT together with their quality index. The memory IMEM 312 stores the last K images selected by the module FSEL 206. Every time a new series of K images is inserted into the memory IMEM 312 by the module FSEL 206, the module MSEL 312 selects the M images having the highest quality indices Q(t).

This solution uses an additional memory space to store K images.

To decide whether or not an iris image is exploitable, the quality threshold QT can be determined empirically on the basis of experiments, or using a learning machine APM 316 (SVM, Bayesian approach, etc.). These two solutions give good results (low FAR and FRR rates) if the images used during the learning are representative of the actual images to be processed. The use of a learning machine requires a relatively large memory space to save the parameters characterizing the exploitable and non-exploitable images for the recognition. The use of a learning machine of the Bayesian type enables performances virtually identical to those of the empirical approach to be obtained. However, the learning machine offers the advantage of providing performances which improve with the quantity of images analyzed. The rate of false rejections FRR is relatively high particularly due to the sharpness operator used which has a non-zero dispersion. The result is that certain irises with low texture will be classified in the blurred images. To limit this disadvantage, the threshold QT can be increased to the detriment of a higher rate of false alarms FAR.

Generally speaking, the case of selection error (false alarms) appears with slightly out-of-focus images. To correct these errors, the threshold QT can be increased to be stricter in the selection of the best images, which causes an increase in the rate of false rejections. On the other hand, the iris images supplied to the iris recognition device RD (see RD 5 of FIG. 1) are of better quality (the system stops the acquisitions after having selected the desired number of exploitable images for the identification).

It will be understood by those skilled in the art that various alternative embodiments and applications are possible. In particular, embodiments may exploit the principle of combining fast and unrefined image pre-selection processing, requiring minor calculation means, followed by finer image selection processing which is more expensive in terms of calculation resources. Thus, the number of images that must be analyzed by the fine image selection processing is reduced by the pre-selection processing. Embodiments of methods may thus be particularly suited to analyzing a large number of images with low-performance calculation means. Embodiments may be applicable to images which are not necessarily iris images. It is not therefore essential either for these images to be correlated in time when the pre-selection processing is not based on a measurement of the speed of movement of a pattern between two images. While embodiments reduce the need for an auto-focus device, embodiments may also be used with images supplied by a camera having such a device. Embodiments may be employed with images in gray levels and to images in color, or combinations thereof.

Embodiments of the systems and methods described herein may be implemented in a variety of ways, including as a combined system or as separate subsystems. Embodiments may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, separately described sub-modules may be combined. For example, with reference to FIG. 12, in some embodiments SES 210, DLP 202, QSEL 204 and PPP 208 may be combined into a QSEL module. In another example, with reference to FIG. 12, in some embodiments FSEL 206, IMEM 312, MSEL 314 and APM 316 may be combined into a FSEL module.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
automatically pre-selecting images based on a first analysis of at least a sharpness of each image in a sequence of images received in a stream to produce a set of pre-selected images, the automatically pre-selecting including:
locating a pattern in each image of the sequence;
estimating a speed of displacement of the pattern between two successive images in the sequence; and
selecting the images for which the estimated speed of displacement of the pattern is lower than a speed threshold; and
automatically selecting images among the pre-selected images based on a second analysis of at least one of a sharpness and a contrast of each image in the set of pre-selected images to produce a set of output images, the automatically pre-selecting and the automatically selecting being performed by a configured electronic device.

2. The method according to claim 1 wherein the pre-selecting of images further comprises:
determining a contrast of each image in the set of images;
comparing the contrast obtained with a contrast threshold; and
rejecting an image if the contrast obtained is lower than the contrast threshold.

3. The method according to claim 1 wherein the locating the pattern in each image comprises steps of:
estimating a position of the pattern in the image depending on the position of the pattern in a previous image of the sequence;
defining a search zone of the pattern centered on the estimated position of the pattern in the image; and
searching the search zone for the pattern.

4. The method according to claim 1 wherein the pattern is an image of a pupil of an eye.

5. The method according to claim 4 wherein the image of the pupil is located in a search zone by searching for pixels having an intensity lower than an intensity threshold, and by determining a center and a radius of a circle following approximately a contour of the pixels having an intensity lower than the intensity threshold.

6. The method according to claim 4 wherein the selection of images comprises a step of measuring a density of black pixels in a window for locating the pupil in each image.

7. The method according to claim 4 wherein the selection of images comprises a step of measuring a sharpness of a texture of an eye iris image in each image.

8. The method according to claim 7 wherein the measuring the sharpness of the texture of the iris is applied to the pixels of the image of the iris situated on a substantially circular ring centered substantially on a center of the image of the pupil and having a width of at least one pixel.

9. The method according to claim 8 wherein the measuring the sharpness of the texture of the image of the iris comprises measuring energy of medium-frequency components of pixels situated on the ring.

10. The method according to claim 4 wherein the selection of the images comprises a step of calculating a quality index for each image according to a density measurement of black pixels of the pupil image, to a measurement of sharpness of the texture of the iris image and to a measurement of speed of displacement of the pupil in the image in relation to the previous image in the image sequence, and a step of comparing the image quality index with a quality threshold, the images selected having a quality index greater than the quality threshold.

11. The method according to claim 1, further comprising a prior step of spatial sub-sampling of the images in the set of images.

12. The method according to claim 1, further comprising steps of storing a first number of selected images, and of selecting a second number of images having at least one of a highest sharpness and contrast out of the images stored.

13. A device, comprising:
an image pre-selection module configured to select images from a sequence of images received in a stream based on at least a sharpness analysis of images in the sequence of images; and
an image output selection module configured to selectively output images selected by the pre-selection module based on an analysis of at least one of a sharpness and a contrast of each pre-selected image, wherein the pre-selection module is configured to:
locate a pattern in each image of the sequence;
estimate a speed of displacement of the pattern between two successive images of the sequence; and
select images for which the estimated speed of displacement of the pattern is lower than a speed threshold.

14. The device according to claim 13 wherein the pre-selection module is further configured to:
calculate a contrast of each image in the set of images;
compare the contrast obtained with a contrast threshold; and
select the image if the contrast obtained is higher than the contrast threshold.

15. The device according to claim 13 wherein the pre-selection module is configured to:
estimate a position of the pattern in a current image depending on the position of the pattern in a previous image of the sequence;
define a search zone of the pattern centered on the estimated position of the pattern in the image; and
locate the pattern in the current image by limiting the search to the search zone.

16. The device according to one of claim 13 wherein the pattern is the image of the pupil of an eye.

17. A system for processing a sequence of images in an image stream, comprising:
means for pre-selecting a set of images in the image stream that satisfy a sharpness criteria, including means for locating a pattern in each image of the sequence, means for estimating a speed of displacement of the pattern between two successive images of the sequence, and means for selecting images for which the estimated speed of displacement of the pattern is lower than a speed threshold; and
means for determining which images in the set of images selected by the means for pre-selectimg satisfy a contrast criteria, coupled to the means for pre-selecting.

18. The system of claim 17 wherein the means for determining whether images in the set of images selected by the means for pre-selecting satisfy the contrast criteria comprises:
a pupil detection and locating module;
a quick-image selection module; and
a pupil tracking module.

19. The system of claim 18 wherein the means for determining whether images in the set of images selected by the means for pre-selecting satisfy the contrast criteria further comprises a sub-sampling module.

20. The system of claim 17 comprising a fine-image selection module.

21. The system of claim 20 comprising an image memory and an image-selection module.

22. The system of claim 20 comprising a learning module.

23. The system of claim 17, further comprising: a recognition device coupled to the means for pre-selecting.

24. A device, comprising:
an image pre-selection module configured to select images from a sequence of images received in a stream and including:
a sharpness analysis block configured to:
locate a pattern in images of the sequence;
estimate speeds of displacement of the pattern between two successive images of the sequence; and
compare the estimated speeds of displacement of the pattern to a speed threshold; and
a contrast analysis block configured to:
calculate contrasts of images in the sequence; and
compare the calculated contrasts with a contrast threshold; and
an image output selection module configured to selectively output images selected by the pre-selection module based on of at least one of a second sharpness analysis and a second contrast analysis of images selected by the pre-selection module.

25. The device according to claim 24 wherein the pre-selection module is configured to select images in the sequence when an estimated speed of displacement of an image is lower than the speed threshold and the calculated contrast of the image is higher than the contrast threshold.

26. The device according to claim 24 wherein the sharpness analysis block is configured to:
   estimate a position of the pattern in a current image depending on the position of the pattern in a previous image of the sequence;
   define a search zone of the pattern centered on the estimated position of the pattern in the image; and
   locate the pattern in the current image by limiting the search to the search zone.

27. The device according to one of claim 24 wherein the sharpness analysis block is configured to locate a pupil of an eye in an image.

28. A non-transitory computer-readable medium containing instructions which cause a processor to perform a method, the method comprising:
   automatically pre-selecting images based on a first analysis of at least a sharpness of each image in a sequence of images received in a stream to produce a set of pre-selected images, the automatically pre-selecting including:
      locating a pattern in each image of the sequence;
      estimating a speed of displacement of the pattern between two successive images in the sequence; and
      selecting the images for which the estimated speed of displacement of the pattern is lower than a speed threshold; and
   automatically selecting images among the pre-selected images based on a second analysis of at least one of a sharpness and a contrast of each image in the set of pre-selected images to produce a set of output images.

29. The medium of claim 28 wherein the pre-selecting of images further comprises:
   determining a contrast of each image in the set of images;
   comparing the contrast obtained with a contrast threshold; and
   rejecting an image if the contrast obtained is lower than the contrast threshold.

30. The medium of claim 28 wherein the locating the pattern in each image comprises:
   estimating a position of the pattern in the image depending on the position of the pattern in a previous image of the sequence;
   defining a search zone of the pattern centered on the estimated position of the pattern in the image; and
   searching the search zone for the pattern.

31. The medium of claim 30 wherein the pattern is an image of a pupil of an eye.

32. The medium of claim 31 wherein the image of the pupil is located in the search zone by searching for pixels having an intensity lower than an intensity threshold, and by determining a center and a radius of a circle following approximately a contour of the pixels having an intensity lower than the intensity threshold.

* * * * *